(12) United States Patent
Shaw

(10) Patent No.: US 8,122,769 B1
(45) Date of Patent: Feb. 28, 2012

(54) MULTI-DIAPHRAGM PRESSURE SENSORS

(75) Inventor: Greg S. Shaw, Shaker Heights, OH (US)

(73) Assignee: Orbital Research, Inc, Cleveland, OH (US)

( * ) Notice: Subject to any disclaimer, the term of this patent is extended or adjusted under 35 U.S.C. 154(b) by 0 days.

(21) Appl. No.: 12/875,530

(22) Filed: Sep. 3, 2010

Related U.S. Application Data

(63) Continuation of application No. 12/156,917, filed on Jun. 5, 2008, now Pat. No. 7,806,001.

(60) Provisional application No. 60/933,264, filed on Jun. 5, 2007.

(51) Int. Cl.
*G01L 7/08* (2006.01)
(52) U.S. Cl. .......................................... 73/715
(58) Field of Classification Search .................. None
See application file for complete search history.

(56) References Cited

U.S. PATENT DOCUMENTS

2004/0187588 A1* 9/2004 Miyazawa ...................... 73/716
* cited by examiner

*Primary Examiner* — Andre Allen
(74) *Attorney, Agent, or Firm* — Brian M Kolkowski; Robert K Schmidt

(57) ABSTRACT

The present invention relates to a pressure sensor comprising multiple flexible diaphragms to which are affixed, within which are embedded, or which themselves constitute part of transducer elements that are connected together electrically, providing greater sensitivity and allowing the diaphragms to be made smaller, thereby increasing burst pressure to operating pressure ratio. This multi-diaphragm pressure sensor can therefore be used to accurately measure small changes in dynamic pressure in a fluid of overall high static pressure, for example, in a flow inventory control system as may be used in a fire suppression system, or for control of nuclear reactor systems.

20 Claims, 3 Drawing Sheets

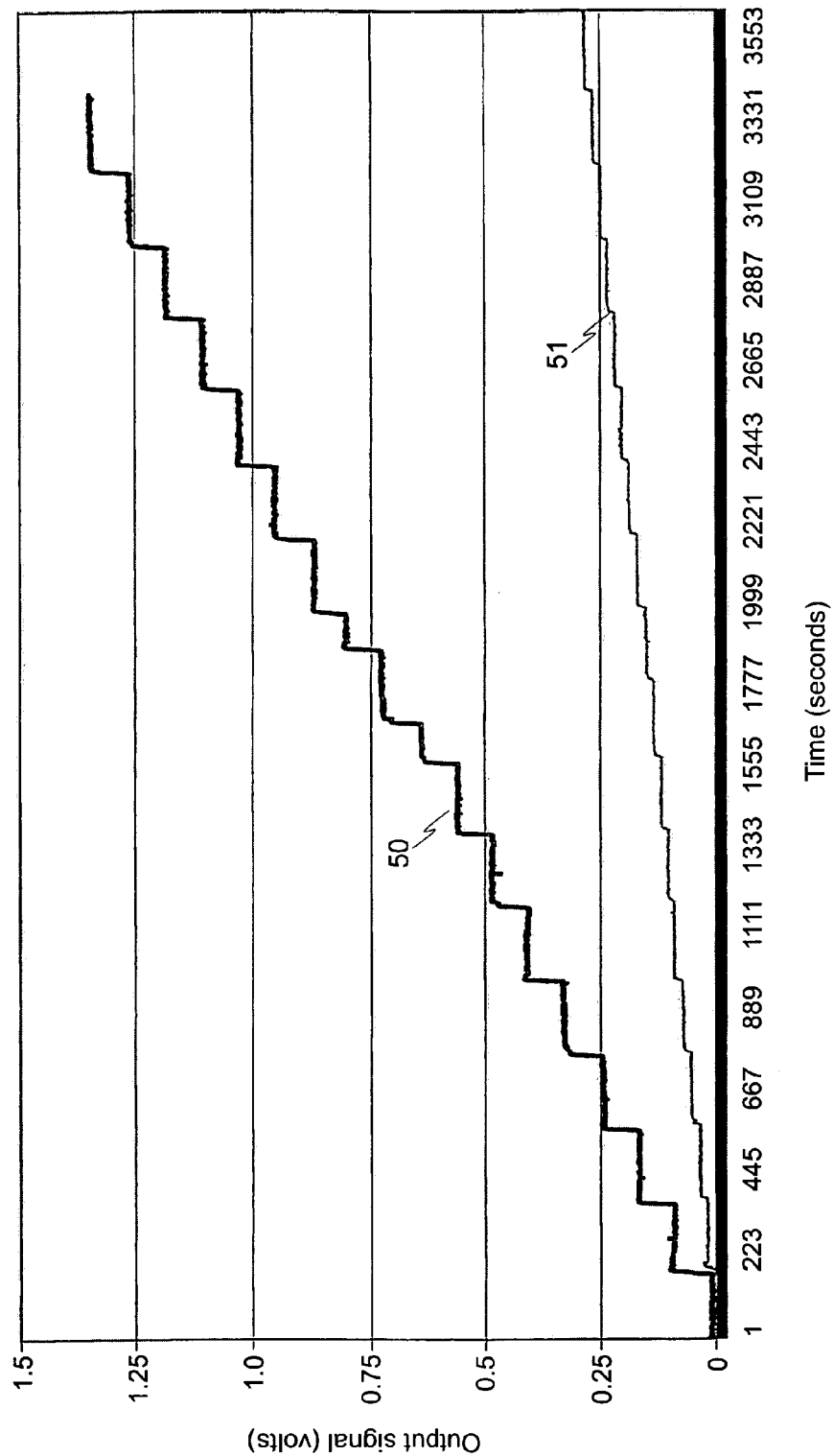

MULTI-DIAPHRAGM PRESSURE SENSORS

CROSS-REFERENCE TO RELATED APPLICATION

This application is a continuation of U.S. patent application Ser. No. 12/156,917, filed on Jun. 5, 2008 and issued on Oct. 5, 2010 as U.S. Pat. No. 7,806,001 B1, which claims priority to U.S. Provisional Application No. 60/933,264, filed Jun. 5, 2007.

LICENSE RIGHTS-FEDERAL SPONSORED

The U.S. Government has a paid-up license in this invention and the right in limited circumstances to require the patent owner to license others on reasonable terms provided for by the terms of contract numbers N65538-05-M0012 and N00024-06-C-4128 awarded by the United States Navy.

BACKGROUND OF THE INVENTION

1. Field of the Invention

The present invention relates to sensors for measuring the pressure of fluids, and particularly to pressure sensors that involve the use of a diaphragm that is deflected by a pressure differential. More particularly, the invention relates to the use of multiple diaphragms to make a single pressure sensor with advantageous characteristics.

2. Technical Background

There exists a great need for the ability to precisely measure pressures of fluids (liquids or gases), particularly where there is demand for very high overpressure capability relative to the pressure range of interest or in other conditions that are typically harsh for pressure sensors. This capability has a large number of diverse applications, particularly those that involve differential pressure sensing in systems capable of withstanding high pressures. These applications may include monitoring of fluid control valves for flow inventory systems (as may be found, for example, in automated fire suppression systems and similar water distribution systems, nuclear reactors, refineries and similar chemical process plants, and utility systems), for the improved control of combustion engines, and in other critical pressurized liquid and gas flow systems.

Diaphragm-type pressure sensors are those pressure sensors that transduce pressures into electrical signals by means of a flexible diaphragm over an opening bored or etched out of a substrate. The diaphragm may be affixed over the opening, may be formed by a thinning of the substrate layer in a region, or may be created by any number of other methods known to those skilled in the art. The diaphragm of these type of sensors deforms or flexes to a degree determined by the differential pressure between the two sides of the diaphragm; on one side of the diaphragm exists the one pressure region of interest, and on the other side of the diaphragm exists another pressure region of interest or of some known reference pressure. The word "opening" as used in this patent is meant to signify any space into which or out of which a flexible diaphragm may deflect. An opening may be a full bore completely through a substrate or may consist of an evacuation underneath a diaphragm, e.g. unpressurized, pressurized or a vacuum.

Pressure-sensing diaphragms may behave as thin plates or thick plates, depending upon the diaphragm's material and its dimensions. When a thin-plate diaphragm deflects under a pressure difference, all areas on the surface of the diaphragm that is on the outside of the arc of deflection experience tension. When a thick-plate diaphragm deflects under a pressure difference, the areas of the diaphragm on the inside of the arc of deflection undergo compression and the areas of the diaphragm on the outside of the arc of deflection experience tension.

The strain or deflection of a pressure-sensing diaphragm may be transduced into an electrical signal. The two most typical approaches involve, respectively, resistive transducer elements and capacitive transducer elements.

The most common form of the resistive approach involves one or more strain gauges bonded to or diffused into the diaphragm. With a pressure difference between its two sides, the strain induced on an area of the diaphragm due to its deflection causes the one or more strain gauges to change dimensions in a way that depends on their placement position and orientation on the diaphragm, the direction of the diaphragm deflection, and whether the diaphragm is a thick-plate or thin-plate diaphragm. This change of dimensions involves an expansion in one or two dimensions and a contraction in the other dimensions, and has the effect of increasing or decreasing the strain gauges' resistive values. The change in resistance of the strain gauges can be measured electrically by using, for example, a circuit such as a Wheatstone bridge. When resistive transducer elements are used, at least one transducer element is placed in one leg of such a bridge, making the bridge a quarter bridge; more preferably, at least two transducer elements are placed in two legs of such a bridge, making the bridge a half bridge; even more preferably, at least four transducer elements are placed in four legs of such a bridge, making the bridge a full bridge. While the full bridge configuration is preferred for its improved sensitivity and linearity of output signal to applied pressure on the sensor, the half bridge configuration is used where physical conditions do not allow mounting of two complementary pairs of transducer elements to a diaphragm, and the quarter bridge configuration is used where it is impossible to mount even a single pair of transducer elements to a diaphragm. The signal output of the bridge may be conditioned (e.g., filtered, amplified, digitized, etc.) before the electrically-transduced pressure signal is implemented as part of a larger system. Signal conditioning circuitry may be fabricated on the same substrate as that upon which the diaphragm is mounted, or signal conditioning circuitry may be manufactured separately and later connected to the pressure sensor.

In the most common form of the capacitive approach, the pressure diaphragm itself constitutes one plate of a capacitor that changes its value under pressure-induced displacement. In such a sensor both plates of the capacitive sensor may be deformable. As the capacitance of a parallel-plate capacitor is inversely proportional to the distance between plates, the capacitance value of such a diaphragm-type pressure sensor increases as the diaphragm deflects inward toward the other plate of the capacitor, and, conversely, the capacitance value of such a diaphragm-type pressure sensor decreases as the diaphragm deflects outward out of its substrate away from the other plate of the capacitor. The simplest methods for measuring capacitance value involve charging and discharging the capacitor under test with a known current and measuring the rate of rise of the resulting voltage; the slower the rate of rise, the larger the capacitance. Bridge circuits operating under alternating current conditions can be used to measure capacitances as they can with resistances. The signal output of the capacitance measurement circuit may be conditioned before the electrically-transduced pressure signal is implemented as part of a larger system, and signal conditioning circuitry may be fabricated on the same substrate as that upon which the diaphragm is mounted, or may be separately manufactured and attached.

Under typical manufacturing processes, the diaphragm, its substrate, and any accompanying signal conditioning electronics are fabricated onto a single die, which is then optionally combined with other circuitry or mounted into a partially sealed housing that leaves the diaphragm exposed, which then may be installed into the larger system in which pressures of interest are to be measured. The dimensions, area, thickness, and material properties (such as stiffness) of the diaphragm determine its maximum operating pressure, maximum recovery pressure, and its burst pressure.

The maximum operating pressure is the pressure that can be placed across the diaphragm up to which the sensor produces an accurate reading. The maximum operating pressure determines upper limit of the sensor's useful range.

The maximum recovery pressure, or overpressure limit, is the pressure that can be placed across the diaphragm without damaging the pressure sensor. A diaphragm-type sensor is capable of returning to normal operation up to its maximum recovery pressure, even though it may deliver a saturated (i.e., constant, inaccurately low) output signal in the range between its maximum operating pressure and its maximum recovery pressure, such range being known as "overpressure." Once the sensor exceeds its overpressure limit, the sensor may not be capable of returning to normal operation owing to a permanent deformation of the diaphragm or other structural or electrical damage resulting from the strain of the diaphragm beyond its elastic limits. Hence, a diaphragm-type sensor that has sustained damage from overpressure may report output even with no load on the sensor, i.e., no substantial elastic deflection of the diaphragm. Commercially available harsh-environment diaphragm-type pressure sensors are typically rated for a maximum recovery pressure of about 50% over maximum operating pressure.

The burst pressure of a diaphragm-type sensor is the amount of pressure difference that can be placed across the diaphragm before it suffers a mechanical failure that results in leakage of fluid across the barrier created by the diaphragm. Commercially available harsh-environment diaphragm-type pressure sensors are typically rated to several hundred or several thousand psi, for a burst pressure to maximum operating pressure ratio (also known as the "burst pressure ratio") of less than 3:1.

The trade-off between diaphragm characteristics, e.g. opening size, thickness and stiffness, and burst pressure ratio is always a difficult challenge in the case of sensors that require high sensitivity in environments that may also present high maximum pressures. A diaphragm-type sensor can be made to have a higher sensitivity by using a larger, thinner, more pliant diaphragm, as a greater range of mechanical deflection under strain is more easily transduced into a greater range of electrical signal output, but correspondingly these diaphragms are also more susceptible to fracturing under overpressure conditions, destroying the sensor.

It is therefore the object of the present invention to provide an improved sensor with increased sensitivity along with a corresponding higher maximum recovery pressure and higher burst pressure ratio.

SUMMARY OF THE INVENTION

The present invention relates to sensors for measuring the pressure of fluids, and particularly to pressure sensors that involve the use of a diaphragm that is deflected by a pressure differential. More particularly, the invention relates to the use of multiple diaphragms to make a single pressure sensor with advantageous characteristics.

In a number of preferred embodiments, the sensor of the present invention comprises a substrate material with at least two openings, at least two flexible diaphragms provided on the substrate material over the at least two openings, and transducer elements deposited on, or in part comprising, the flexible diaphragms. The transducer elements are embedded or affixed above, under, or within the diaphragms, or include the diaphragms themselves as part of the transducers, and are electrically connected such that the signals are additive, providing a greater signal relative to the deflection of each diaphragm individually. The diaphragms of the present invention therefore can be made smaller, thicker, or less pliant such that they are better able to resist permanent deformation or fracture. The use of additive transduced signals of multiple diaphragms is especially useful where there is demand for very high overpressure capability relative to the pressure range of interest. The sensor design described gives the ability to precisely measure a small differential pressure across a valve, filter, etc. and still withstand the full pressure in a high-pressure system. A specific example is the ability to measure differential pressure across a control valve in the fire suppression systems of naval warships. The ability to achieve an operating range as small as a few pounds per square inch (psi) in a high pressure environment allows determination of the flow through the valve and can enable the ability to detect system leaks. The system itself runs at hundreds or thousands of psi, and both test and upset conditions can cause the differential pressure sensor to see the full system pressure, thus it is necessary to have a very high ratio of overpressure capability of the sensor relative to the measurement range of interest. Other systems that might benefit from a sensor such as this include (but are not limited to) nuclear power plants (both the radioactive side and the non-radioactive side), chemical plants, refineries, water distribution system, utility systems, engine control and the like.

The transducer elements themselves can be of any number of types. In one embodiment of the invention, the transducer elements are of the simple metal strain gauge type. In other embodiments, other transducer element types could be used. These include, but are not limited to, piezoresistive elements, shape memory alloy elements, or capacitive elements. The circuitry for the latter is somewhat different, as capacitors need to be connected electrically in parallel rather than in series in order for their signals to be additive.

For a given burst pressure or for a given maximum recovery pressure, the sensitivity of a multi-diaphragm pressure sensor is greater with more diaphragms. If the diaphragms are substantially identical, and if the transducer elements used to detect the deflections of the diaphragms are electrically connected such that the signals are additive, the sensitivity improvement gained by using multiple diaphragms is approximately proportional to the number of pressure-sensing diaphragms incorporated in the multi-diaphragm sensor. The burst pressure ratio of a multi-diaphragm pressure sensor can be therefore be tailored according to the number of diaphragms that are used. The greater the number of diaphragms, the greater the sensitivity of the pressure sensor and correspondingly the higher the burst pressure that can be achieved at these higher sensitivities. The ratio of burst pressure to sensor operating range, hereafter referred to as the operating pressure ratio, is a function of the number of diaphragms incorporated according to the present invention.

The following are examples of different embodiments of the present invention. One embodiment of the present invention is a pressure sensor comprising a substrate with at least two openings, at least two flexible diaphragms across the at least two openings, at least two strain gauges, the at least two diaphragms each having the strain gauges for measuring a deflection of the diaphragm, the at least two strain gauges being electrically connected in series.

Another embodiment of the present invention is a pressure sensor comprising a substrate with at least two openings, at least two flexible diaphragms across the at least two openings, at least two surfaces each substantially parallel to one of the at least two flexible diaphragms, forming at least two capacitive transducer elements, the deflection of the at least two diaphragms each changing the electrical capacitance between the diaphragm and its parallel surface, the at least two capacitive transducer elements being electrically connected in parallel.

Still another embodiment of the present invention is a pressure sensor comprising a substrate with at least two openings, at least two flexible diaphragms across the at least two openings, at least two resistive transducer elements, the at least two diaphragms each having the resistive transducer element for measuring a deflection of the diaphragm, the at least two resistive transducer elements being electrically connected in series.

Still yet another embodiment of the present invention is a pressure sensor comprising a diaphragm type pressure sensor, the pressure sensor having a maximum recovery pressure and the pressure sensor having an operating pressure wherein the ratio of the maximum recovery pressure to the operating pressure is greater than about 5:1.

Still yet even another embodiment of the present invention is a pressure sensor comprising at least two flexible diaphragms, the diaphragms each having a resistive transducer element for measuring deflection of the diaphragm, the transducer elements being wired together electrically in series.

Yet another embodiment of the present invention is a pressure sensor comprising at least two flexible diaphragms, the diaphragms each having a capacitive transducer element for measuring deflection of the diaphragm, the transducer elements being wired together electrically in parallel.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIG. 4 Graph of a data set demonstrating the effectiveness of the multi-diaphragm pressure sensor.

DESCRIPTION OF THE PREFERRED EMBODIMENT(S)

Figure 1:
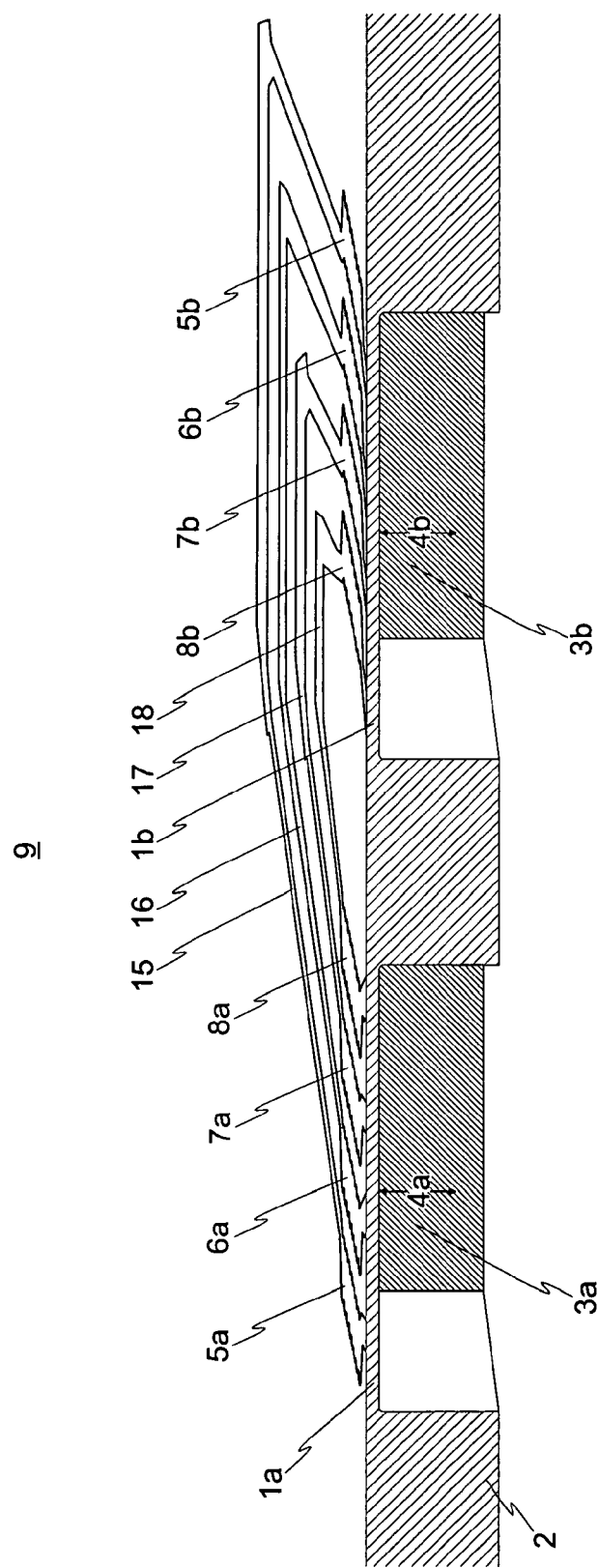
FIG. 1 Cross-sectional view of a two-diaphragm pressure sensor arranged electrically in series in one embodiment of the pressure sensor.

The present invention relates to pressure sensors that use multiple transducer elements to detect pressure-induced deflections of multiple flexible diaphragms, said transducer elements being wired in such a way that the signals are additive. The present invention further relates to pressure sensors of improved sensitivity. The present invention further relates to pressure sensors capable of sensing small pressure changes at high overall pressures. The present invention furthermore relates to multiple diaphragm pressure sensors wherein the individual diaphragms can be made smaller or stiffer to yield a higher burst pressure while retaining high sensitivity.

A number of embodiments of the present invention include a pressure sensor comprising a substrate with at least two openings and at least two flexible diaphragms held across the openings of the substrate. The substrate can be made from any material known to those skilled in the art. If the openings of the substrate are large, they correspondingly require larger diaphragms, and, in the case of measurement of larger pressures, larger openings correspondingly require diaphragms with more robust mechanical properties. If the openings, and therefore the diaphragms, are small, the sensitivity of the device suffers. However, it is an object of the present invention to provide a sensor that uses multiple, smaller diaphragms with higher maximum recovery pressures and/or higher burst pressures.

Preferably, the maximum cross-sectional dimension of at least one of the opening across which one the flexible diaphragms is affixed is less than about 5.0 millimeters, more preferably less than about 2.0 millimeters, still more preferably less than about 1.0 millimeters, yet more preferably less than about 0.5 millimeters, and most preferably less than about 0.25 millimeters. The diaphragms, likewise, can also be made from any material known to those skilled in the art, provided they have a flexibility corresponding to the pressure and the pressure range for which it is desired to be measured. Preferably, the diaphragms are made from a material across which a transducer element can be affixed, embedded or deposited and a good bond can be formed. More preferably, the diaphragms are made from silicon. Preferably, the flexible diaphragms each have a thickness less than about 200 micrometers extending across the opening of the substrate, more preferably less than about 100 micrometers, and most preferably less than about 60 micrometers. Diaphragm dimensions and materials are preferably optimized to provide high sensitivity while providing adequate fracture strength to withstand high static pressures.

The pressure sensor of the present invention preferably is capable of measuring a wide range of pressures, and for measuring pressure in systems of fairly high total pressure without premature failure. This is because while these pressure sensors can be used for any application known to those skilled in the art, many of those applications are in areas requiring the measurement of small fractions of those high total pressures. Some areas of prime application of these pressure sensors are for the measurement of pressures in flow inventory systems such as fire suppression systems, the measurement of pressures in nuclear reactors, the measurement of pressures in chemical process systems, the measurement of pressures in turbine engines, and the measurement of pressures in internal combustion engines. Because of this, preferably, the pressure sensor has a maximum operating pressure up to and above 1000 psi; more preferably, above about 2000 psi; even more preferably above about 3000 psi; still more preferably above about 5000 psi, yet more preferably above about 10,000 psi, and most preferably above about 20,000 psi without premature failure. Also preferably, the pressure sensor is capable of accurately measuring pressures less than about 50 psi; more preferably, less than about 10 psi; even more preferably less than about 5 psi; still preferably less than about 1 psi, even still preferably less than about 0.1 psi, and most preferably less than about 0.01 psi.

Preferably, the burst pressure of the pressure sensor of the present invention is greater than about 5000 psi, more preferably greater than about 10000 psi, even more preferably greater than about 25000 psi, still more preferably greater than about 50000 psi and most preferably greater than about 100000 psi, though the burst pressure is preferably defined by the specific application.

The multiple diaphragm pressure sensors of the present invention have very large ratios of burst pressure or maximum recovery pressure to maximum operating pressure or standard measurement pressures. Standard measurement or operating pressures are those pressures that the pressure sensor sees in the typical operating environment in which it is used. The multiple diaphragm pressure sensor of the present invention has a ratio preferably greater than about 3:1, more preferably greater than about 4:1, even more preferably greater than about 5:1, still even more preferably greater than about 10:1, still more preferably greater than about 25:1, still more preferably greater than about 35:1, even more preferably greater than about 50:1, still even more preferably greater than about 100:1 and most preferably greater than about 150:1. One of the benefits of the multiple diaphragm pressure sensors is the ability to tailor the sensitivity of the pressure sensor relative to the system pressure. Another benefit is the extreme overpressure capability of these types of pressure sensors based on the good sensitivity provided through the additive signal. The multiple diaphragm pressure sensors of the present invention can be used with platinum, shape memory alloy, piezoresistive, piezoelectric, capacitive and other sensing elements.

Preferably, the pressure sensor of the present invention has at least 2 diaphragms per sensor, more preferably at least 3 diaphragms per sensor, even more preferably at least 4 diaphragms per sensor, still even more preferably at least 5 diaphragms per sensor, and most preferably at least 6 diaphragms per sensor. The number of diaphragms is mainly limited by the physical size required of the sensor. The smaller size requires compromises to be made in the number of diaphragms used and thereby the potential sensitivity of the pressure sensor or a given required burst pressure capability.

Optionally, the pressure sensor of the present invention can be 2 or more diaphragm type pressure sensors electrically connected together to measure pressure in a chamber or confined space. If the pressure sensors ganged together are of the resistive type they can be connected in series and if the pressure sensors are of the capacitive type they can be connected in parallel.

The application temperatures of the pressure sensors of the present invention may be room temperature, but also include high temperature use. If the pressure sensor is used in a high temperature application, preferably the pressure sensor is capable of performing at high sensitivity at temperatures greater than about 250° C., more preferably greater than about 300° C., even more preferably greater than about 350° C., still more preferably greater than about 400° C., and most preferably greater than about 450° C.

In some embodiments of the present invention, the pressure sensor of the present invention has a heating element capable of heating the transducer element, whether it be a strain gauge or some other type of element, to at least about the application temperature (and in the case of SMA materials to the transformation temperature). This allows for stabilization of the transducer element in applications where the temperature varies. This also provides a method of determining pressures comprising the steps of providing a sensing element for a chamber having a given operating temperature for the chamber in which a pressure is to be measured, heating the sensing element to at least about the operating temperature of the chamber and measuring the pressure of the chamber through the sensing element. Preferably, the heating element heats the sensing element to a temperature at or above the highest application temperature of the sensing element.

Figure 2:
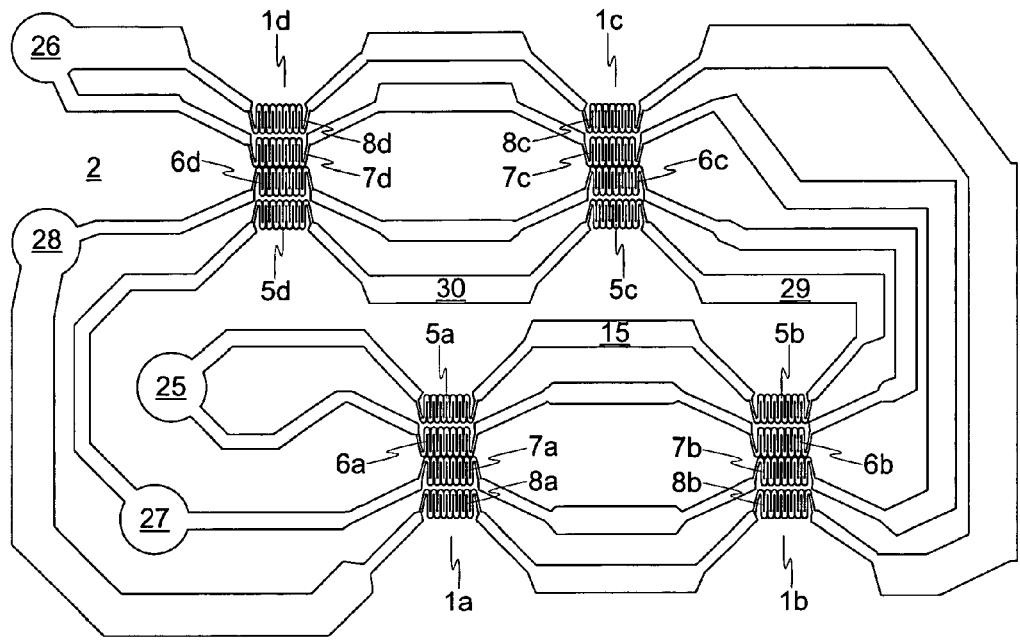
FIG. 2 Schematic view of the resistive transducer elements of a four-diaphragm pressure sensor and the connections between them, with the resistive transducer elements arranged in series in a Wheatstone bridge configuration.
Figure 3:
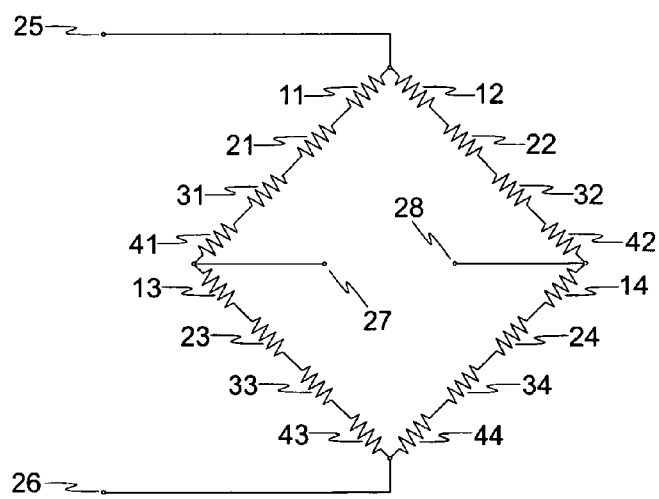
FIG. 3 Equivalent electrical circuit diagram of the series strain gauges arranged in the Wheatstone bridge of FIG. 2.

Various embodiments of the present invention are illustrated in FIGS. 1-3. FIG. 1 shows a cross-section of two flexible diaphragms 1a, 1b fabricated onto a substrate 2. The substrate 2 may be made of any suitable material known to those skilled in the art. In the illustrated embodiment, the substrate is made of silicon. Similarly, the diaphragms may likewise be made of any suitable material and affixed by any process known to those skilled in the art. In the illustrated embodiment, the diaphragms are one and the same material as the substrate and are formed by a thinning of the substrate to create the diaphragm. Four strain gauges 5a, 6a, 7a, 8a are attached onto the flexible diaphragm 1a, and similarly, four strain gauges 5b, 6b, 7b, 8b are attached onto the flexible diaphragm 1b. The strain gauges 5a, 6a, 7a, 8a, 5b, 6b, 7b, 8b may be affixed to or embedded on the flexible diaphragms 1a, 1b by any process known to those skilled in the art. Preferably, the strain gauges 5a, 6a, 7a, 8a, 5b, 6b, 7b, 8b are deposited onto the flexible diaphragms 1a, 1b using a micromachining fabrication process. An opening 3a in the substrate 2 has been evacuated, forming flexible diaphragm 1a. Similarly, the opening 3b has been evacuated into the substrate 2, forming flexible diaphragm 1b. In embodiments of the invention not illustrated, the openings 3a, 3b may be completely enclosed underneath the diaphragm, and may contain a vacuum or may be filled with some gas or liquid such that a known reference pressure exists within the opening. The openings 3a, 3b may also open to the atmosphere 10 (as shown) or to some other chamber of known reference pressure (not shown). When the pressure in test region 9 is greater than the pressure in atmosphere 10, the flexible diaphragm 1a deflects downward into the opening 3a, decreasing the distance 4a. When the pressure in the test region 9 is less than the pressure in atmosphere 10, the flexible diaphragm 1a deflects upward out of the opening 3a, increasing the distance 4a. This deflection of diaphragm 1a results in a tension or a compression which is measured by the strain gauges 5a, 6a, 7a, 8a altering their electrical resistances. Similarly, when the pressure in the test region 9 is greater than the pressure in atmosphere 10, the flexible diaphragm 1b deflects downward into the opening 3b, decreasing the distance 4b. When the pressure in the test region 9 is less than the pressure in atmosphere 10, the flexible diaphragm 1b deflects upward out of the opening 3b, increasing the distance 4b. This deflection of diaphragm 1b results in tension or compression on strain gauges 5b, 6b, 7b, 8b altering their individual electrical resistance. The strain gauge 5a is electrically connected in series with the strain gauge 5b, the strain gauge 6a is electrically connected in series with the strain gauge 6b, the strain gauge 7a is electrically connected in series with the strain gauge 7b, and the strain gauge 8a is electrically connected in series with the strain gauge 8b. The electrical connections between strain gauges may be made by any means known to those skilled in the art. Preferably, the strain gauges are connected by electrical traces 15, 16, 17, 18 printed onto the sensor.

In other embodiments of the present invention openings 3a, 3b are open to a region of pressure 10 as shown, thereby allowing the pressure sensor to operate as a differential pressure sensor, measuring the difference in pressure between the two sides of the substrate. In such a case, either side of the substrate may be used as the high-pressure region of interest, thus test region 9 and atmosphere region 10 in FIG. 1 may be interchangeable.

FIG. 2 shows the electrical trace layout for a four-diaphragm configuration of various embodiments of the present invention. In FIG. 2, metal strain gauges are used as the transducer elements. Four flexible diaphragms 1a, 1b, 1c, 1d are fabricated onto a substrate 2, each covering an opening (not shown). The diaphragms 1a, 1b, 1c, 1d are spatially offset relative to one another, allowing for a more compact sensor and for shorter and more uniform interconnections between the sensor elements, increasing the sensitivity and decreasing non-linearity or other inaccuracy associated with manufacturing tolerances. Four strain gauges 5a, 6a, 7a, 8a are deposited onto and within the confines of diaphragm 1a, four strain gauges 5b, 6b, 7b, 8b are deposited onto and within the confines of diaphragm 1b, four strain gauges 5c, 6c, 7c, 8c are deposited onto and within the confines of diaphragm 1c, and four strain gauges 5d, 6d, 7d, 8d are deposited onto and within the confines of diaphragm 1d. The strain gauges are electrically connected such that the resistances for the similarly placed strain gauges on each diaphragm are additive. As shown, one terminal of strain gauge 5a on diaphragm 1a is electrically connected to one terminal of strain gauge 5b on diaphragm 1b by electrical trace 15, the other terminal of strain gauge 5b is electrically connected to one terminal of strain gauge 5c on diaphragm 1c by electrical trace 29, and the other terminal of strain gauge 5c is electrically connected to one terminal of strain gauge 5d by electrical trace 30. Strain gauge 6a, strain gauge 6b, strain gauge 6c, and strain gauge 6d are similarly connected in series. Strain gauge 7a, strain gauge 7b, strain gauge 7c, and strain gauge 7d are similarly connected in series. Strain gauge 8a, strain gauge 8b, strain gauge 8c, and strain gauge 8d are similarly connected in series. Four electrical connection points 25, 26, 27, 28 provide terminals for connection of the sensor to signal conditioning circuitry and/or to the larger system of which the sensor is a part. The electrical configuration of the circuit shown in FIG. 2 comprises a Wheatstone bridge, as illustrated in FIG. 3.

FIG. 3 shows the equivalent electrical circuit diagram of the strain gauge configuration illustrated in FIG. 2. Here, in FIG. 3, the resistor 11 represents the resistance of strain gauge 5a on diaphragm 1a in FIG. 2, resistor 21 represents the resistance of strain gauge 5b on diaphragm 1b, resistor 31 represents the resistance of strain gauge 5c on diaphragm 1c, resistor 41 represents the resistance of strain gauge 5d on diaphragm 1d, resistor 12 represents the resistance of strain gauge 6a on diaphragm 1a, resistor 22 represents the resistance of strain gauge 6b on diaphragm 1b, resistor 32 represents the resistance of strain gauge 6c on diaphragm 1c, resistor 42 represents the resistance of strain gauge 6d on diaphragm 1d, resistor 13 represents the resistance of strain gauge 7a on diaphragm 1a, resistor 23 represents the resistance of strain gauge 7b on diaphragm 1b, resistor 33 represents the resistance of strain gauge 7c on diaphragm 1c, resistor 43 represents the resistance of strain gauge 7d on diaphragm 1d, resistor 14 represents the resistance of strain gauge 8a on diaphragm 1a, resistor 24 represents the resistance of strain gauge 8b on diaphragm 1b, resistor 35 represents the resistance of strain gauge 8c on diaphragm 1c, and resistor 44 represents the resistance of strain gauge 8d on diaphragm 1d. Operating in this Wheatstone bridge configuration, a potential difference of, for example, 10 V is applied between input terminal 25 and input terminal 26. The Wheatstone bridge is balanced such that when there is no pressure-induced strain on the diaphragms 1a, 1b, 1c, 1d, the potential difference between output terminal 27 and output terminal 28 is close to about zero. Ensuring that the Wheatstone bridge is in balance may be accomplished through careful design and fabrication, which may include use of trimming resistors in the circuit. When the diaphragms are deflected, the resultant change in the resistances of the strain gauges 5a, 5b, 5c, 5d, 6a, 6b, 6c, 6d, 7a, 7b, 7c, 7d, 8a, 8b, 8c, 8d change the values of the resistances 11, 21, 31, 41, 12, 22, 32, 42, 13, 23, 33, 43, 14, 24, 34, 44, respectively, making the value of the electrical potential difference between output terminal 27 and output terminal 28 non-negligibly non-zero. Within the operating range of the pressure sensor, the amplitude of this electrical potential difference between output terminals 27 and 28 is proportional to the amount of pressure detected by the sensor. Because the illustrated configuration places corresponding strain gauges on each flexible diaphragm in series, the pressure sensor's sensitivity to pressure is enhanced over that of a pressure sensor comprising only any one of the diaphragms individually and its strain gauges. The pressure sensor's linearity is enhanced in this embodiment because the illustrated configuration is a full bridge configuration with each leg of the bridge comprising resistances from strain gauges measuring tension or compression from similar areas of corresponding diaphragms. Because of the spatial proximity of the diaphragms with respect to each other and the spatial proximity of the strain gauges with respect to each other, the transducer elements are all affected equally by temperature, reducing the effects of temperature-induced bridge imbalance and improving the accuracy of the measurement.

FIG. 4 shows a graph demonstrating the effectiveness of using a multi-diaphragm pressure sensor. The upper, darker line shows the output of the sensor using all four diaphragms simultaneously during the operation of the embodiment of the invention illustrated in FIG. 2 and FIG. 3. The data was accumulated over time as pressure steps up to 5 psi were applied to the sensor. The lower, lighter trace was acquired from the exact same sensor, but with 3 of the diaphragms mechanically isolated so that they could not respond to the applied pressure.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What I claim is:

1. A pressure sensor comprising two or more flexible diaphragms each spanning separate openings, the two or more diaphragms being exposed on one side to the same pressurized fluid, each diaphragm having one or more transducer elements affixed thereto, deposited thereon or embedded therein, wherein transducer elements of at least two of the two or more flexible diaphragms are directly electrically connected together.

2. The pressure sensor of claim 1, wherein the transducer elements are strain gauges.

3. The pressure sensor of claim 1, wherein the transducer elements are capacitive.

4. The pressure sensor of claim 1, wherein at least one transducer element has a substantially identical counterpart transducer element on at least one other flexible diaphragm, and at least two counterpart transducer elements are directly connected to each other electrically.

5. The pressure sensor of claim 4, wherein the transducer elements and the electrical connections between them comprise a Wheatstone bridge.

6. The pressure sensor of claim 5, wherein the sensor is fabricated upon a semiconductive substrate, and wherein the Wheatstone bridge has an output representing an electrically-transduced pressure signal, and the output is conditioned by circuitry also fabricated upon the substrate.

7. The pressure sensor of claim 1, wherein the sensor is used in a nuclear power plant.

8. The pressure sensor of claim 1, wherein the sensor is used in a chemical plant.

9. The pressure sensor of claim 1, wherein the sensor is used in a refinery.

10. The pressure sensor of claim 1, wherein the sensor is used in a utility system.

11. The pressure sensor of claim 1, wherein the sensor is used in an engine.

12. The pressure sensor of claim 1, wherein the sensor is used in a water distribution system.

13. The pressure sensor of claim 12, wherein the water distribution system is a fire suppression system.

14. The pressure sensor of claim 13, wherein the fire suppression system is aboard a naval warship, and the pressure sensor is used in a control valve in the fire suppression system.

15. A pressure sensor comprising two or more flexible diaphragms, the two or more diaphragms being exposed on one side to the same pressurized fluid, wherein the pressure sensor measures a single absolute or differential pressure of the pressurized fluid over the two or more diaphragms without measurement of the deflection of any individual diaphragm.

16. The pressure sensor of claim 15, wherein the sensor is sensitive enough to detect small dynamic pressure changes of less than 1 psi at an overall high static pressure of greater than 1000 psi.

17. The pressure sensor of claim 16, wherein the pressure sensor does not comprise, involve or use a stop boss to limit the maximum deflection of any of the flexible diaphragms.

18. A method of measuring the pressure of a fluid comprising additively measuring the output signal contributions of multiple electrical sense elements, the sense elements detecting deflections of at least two flexible diaphragms exposed to the fluid.

19. The method of claim 18, wherein at least one sense element on one of the at least two flexible diaphragms has a substantially identical counterpart sense element on at least one other flexible diaphragm, and at least two counterpart sense elements are directly connected to each other electrically.

20. The method of claim 18, wherein the fluid has a temperature of greater than about 250° C.

\* \* \* \* \*